Patented Apr. 7, 1936

2,036,768

UNITED STATES PATENT OFFICE 2,036,768

PRINTING INK

Herbert Newall Morris, Broxbourne, England, assignor to Rucel Limited, London, England, a British company No Drawing. Application June 17, 1929, Serial No. 371,716. In Great Britain July 13, 1928

1 Claim. (Cl. 134—36)

This invention relates to a printing ink and has for its object an improved ink and better results.

The ink comprises a binding medium which consists of an admixture of solutions of cellulose derivative and rubber. Such admixture is hereinafter referred to as a rubber-cellulose medium by which is meant a solution containing one or more salts of cellulose and rubber and/or rubber-like substance or substances such as balata or gutta-percha to which may be added a natural or artificial color or colors including soluble, lake and pigment colors to make a colored ink.

The invention also includes the preparation of concentrated inks, being portions of the medium in which has been dissolved or incorporated a concentrated natural or artificial color or colors. By mixing these concentrated inks with the uncolored or already colored medium a large number of shades and/or colors is obtainable from a few inks of the principal colors, no special mixing process being required.

The invention also includes the provision of a thinner for the medium which may conveniently be one or a mixture of the solvents used in the medium or color but which must not react adversely with the medium or with the color, which thinner enables the consistency of the ink to be adjusted, as for instance to counteract the effect of evaporation.

The invention also includes the printing medium as such and the product produced therewith.

The invention is primarily intended for use with the intaglio processes, or printing from an etched or engraved plate or roller, where the ink is applied to the surface in bulk, being subsequently scraped or wiped from the non-printing parts before contact with the material being printed upon, but it may be used also in letter-press, lithographic, collotype and other known methods of printing where other methods of application are necessary.

The present invention shows how by the selection of a suitable solvent or solvents in the manufacture of the medium or vehicle, and with or without a natural or artificial color or colors dissolved or incorporated therein, printing can be obtained on any surface such as paper, cardboard, rubber, celluloid, on fabrics generally or on fabrics previously treated with rubber and/or cellulose salt as for waterproofing. The printing produced is keyed on to the surface, whether it be the surface of the sheet of paper, cardboard, rubber, celluloid or fabrics or on their protective cellulose or rubber and cellulose coatings, so as to produce a fast print thereon and in the case of colored prints, actually dyeing such surface by keying on as well as by depositing as a dyed surface the combined rubber or rubber-like substance and cellulose salt forming the transparent or semi-transparent thickening of the medium or vehicle.

The printing may be carried out either by means of a prepared and finished ink, ready for use, in the manner above described, or by separate solution of the uncolored medium or vehicle and the concentrated colored medium above described, and the mixing of the ink then takes place in the printing machine. In this case, the uncolored medium is first introduced into the printing machine and the concentrated color or colors added to produce any desired depth and/or color. In this way, the medium and selection of colors enable the operator to maintain or vary the consistency or depth of color or color of the ink by the mere addition of more of the medium or of one or more of the colors, the depth of color varying with the concentration of the color or colors. Very concentrated solutions of many suitable colors are obtainable, so that a wide range of color or color depth can be obtained. A thinner, which may conveniently be one or a mixture of the solvents used in the medium or color, but which must not react adversely with the medium or the color, is provided, by which the operator may adjust the consistency of the "ink".

As a wide range of solvents may be used in the production of a mixed solution of rubber and cellulose salt, the solvent or solvents used in the preparation of the medium and/or of the ink must be such that it does not materially attack or affect the roller or plate used in the printing, or such roller or plate may have any suitable protective surface against any such possible deterioration.

The product may consist of single or multicolor printings, remarkably fine effects being obtainable without blurring, smudging or spreading, and of a permanent nature, that is to say, the actual surface is penetrated so that the printing or color, if any, is fast except by removal of such surface. Where textile fabrics are printed, the actual surface of the individual fibres is penetrated. Any required depth of penetration may be obtained by the use of suitable solvents in the medium and/or color and/or thinner to vary the consistency and/or rate of drying and/or solvent power.

The "ink" is adaptable to other methods of printing, such as engraving and letter-press printing, and enables results to be obtained which have hitherto been unobtainable in definition, color, and permanency, but the intaglio process lends itself to the most effective printing.

The solvent or solvents employed for the medium or color can be selected from a wide range of different rates of evaporation or penetration, or both, so that the speed of drying and/or penetration can be controlled and easily varied to suit changes of conditions.

White or other effects are obtained by printing with the uncolored or colored medium and subsequently dyeing by means which will not "take" where there has been, or is, such printing.

By way of illustrating the invention, the following examples are given, in which Examples 1 and 2 employ soluble colors, 3, 4, and 5 employ pigment colors, and Example 6 is of a thinner. Example 7 is a printing medium.

Example 1

10 lbs. rubber cellulose solution containing:—
2% raw rubber (balata).
6% cellulose (acetate, nitrate, ethyl cellulose and/or other ester).
6 oz. Spirit fast red 3 B. heated to 50° C. with 16 oz. butyl alcohol.

The rubber cellulose solution is added gradually under stirring and the whole heated to 50° C. and filtered.

Example 2

10 lbs. rubber cellulose solution as in Example 1, heated to 50° C. and poured into 8 oz. induline stearate dissolved in 1 lb. toluol; the whole mixed with a stirrer and filtered or settled.

Example 3

10 lbs. rubber cellulose solution as in Example 1 to which is added 16 oz. alizarin blue lake ground up into paste form with 8 oz. castor oil and the whole warmed to 30° C. and passed through a roller mill and fine gauge filter.

Example 4

10 lbs. rubber cellulose solution as in Example 1, to which is added under stirring 1 lb. hansa yellow powder and heated to 30° C. and well stirred and filtered through fine gauze.

Example 5

10 lbs. rubber cellulose solution as in Example 1.
1 lb. vegetable black ground up with ½ lb. castor oil and the two mixed together with stirring at 30° C. and filtered through fine gauze.

Example 6

|  | Lb. |
|---|---|
| Butyl alcohol | 1 |
| Toluol | 1 |
| Methyl-ethylene-glycol | ½ |
| Tetrahydronaphthalene | ½ |

Example 7.—An uncolored printing medium 10 parts by weight of acetyl cellulose dissolved in 40 parts by weight of butyl acetate, and 40 parts by weight of xylol and mixed with 2½ parts by weight of crepe rubber dissolved in 25 parts by weight of cyclohexanone.

What I claim is:—

A printing ink consisting of a solution containing rubber and cellulose ester, a concentrated color solution containing rubber, cellulose ester and a dye, and a miscible solvent thinner for the rubber and cellulose ester solution comprising two parts butyl alcohol, two parts toluol, one part methyl-ethylene-glycol and one part tetrahydronaphthalene.

HERBERT NEWALL MORRIS.